United States Patent [19]

Snyder

[11] Patent Number: 5,727,939
[45] Date of Patent: Mar. 17, 1998

[54] DEFLECTOR SYSTEM FOR REDUCING AIR INFILTRATION INTO A FURNACE

[75] Inventor: William Joseph Snyder, Ossining, N.Y.

[73] Assignee: Praxair Technology, Inc., Danbury, Conn.

[21] Appl. No.: 699,379

[22] Filed: Aug. 19, 1996

[51] Int. Cl.⁶ .................... F27B 5/04; C03B 5/42
[52] U.S. Cl. .................... 432/205; 432/200; 65/337
[58] Field of Search .................... 432/161, 200, 432/205, 210; 65/135.1, 135.6, 135.7, 335, 337; 110/210, 212, 214

[56] References Cited

U.S. PATENT DOCUMENTS

| | | | |
|---|---|---|---|
| 3,684,262 | 8/1972 | Busby | 263/40 |
| 4,213,753 | 7/1980 | Negroni et al. | 65/337 |
| 4,256,173 | 3/1981 | Tsai et al. | 65/337 |
| 4,487,621 | 12/1984 | Richards | 65/27 |
| 4,655,812 | 4/1987 | Blumfeld | 65/135.1 |
| 5,203,859 | 4/1993 | Khinkis et al. | 432/30 |
| 5,242,296 | 9/1993 | Tuson et al. | 431/10 |
| 5,254,001 | 10/1993 | Frohlich | 432/247 |
| 5,417,731 | 5/1995 | LeBlanc et al. | 65/134.4 |
| 5,569,312 | 10/1996 | Qurik et al. | 110/210 |

FOREIGN PATENT DOCUMENTS 300187  12/1989  Japan .................... 432/205

Primary Examiner—Henry A. Bennett
Assistant Examiner—Gregory Wilson
Attorney, Agent, or Firm—Stanley Ktorides

[57] ABSTRACT

A furnace having a molten material holding tank with sidewall and a tuckstone or other structure above the sidewall upper end leaving a gap, or joint, therebetween. A deflector, or diverter, is provided at the upper end of the sidewall to deflect cooling air directed on the tank sidewall away from the joint and to create a pressure differential between the interior and exterior of the tank thereby reducing air infiltration into the tank through the joint.

8 Claims, 3 Drawing Sheets

5,727,939

DEFLECTOR SYSTEM FOR REDUCING AIR INFILTRATION INTO A FURNACE

FIELD OF THE INVENTION

This invention relates to furnaces, and more particularly to arrangements for preventing air from infiltrating into the furnace through a gap between a furnace wall and a tuckstone. The invention is particularly advantageous for use with glassmaking furnaces.

BACKGROUND OF THE INVENTION

A common type of high temperature furnace often used for the production of molten glass from its constituent raw materials is formed by two main sections. The first section includes a tank having walls made from a suitable refractory material wherein the molten material is held at the lower portion of the furnace tank. The second section, located above the tank, comprises the furnace superstructure including walls and a crown. The superstructure contains the combustion reaction and reflects the heat generated by the combustion reaction to the molten glass to support the melting of the raw materials. Located in the superstructure above the tank is at least one furnace inlet for raw material. In one such type of furnace, support members, usually of a metal such as steel, hold the superstructure section over the tank so that the two sections are independent and can be serviced individually. The support members are typically made of metal, e.g. steel.

At the lowest point of the furnace superstructure, sometimes positioned on the steel support members that support the superstructure, is a tuckstone of a suitable refractory material. The tuckstone is the base upon which the furnace superstructure rests and is used to protect the metal support member from thermal degradation. There is usually a gap between the upper end of the tank sidewall and the tuckstone. The entire furnace is located in an ambient environment. That is, the exterior of the furnace is exposed to air. Also, air is sometimes blown at a relatively high velocity against the upper part of the furnace sidewall to cool it.

Older glass furnaces processed the molten raw material with an internal atmosphere comprising the combustion products of air and fuel. Since the gases, both external and internal of the furnace, had significant levels of nitrogen, there was no contamination of the furnace internal atmosphere even with leakage of air into the furnace through the gap between the upper end of the tank sidewall and the lower surface of the tuckstone.

As glass furnaces are converted to use fuel firing with a higher oxygen content to improve efficiency, it is becoming important to reduce the nitrogen gas content in the furnace in order to achieve the lowest possible NOx emissions. Since 78% of air is $N_2$, its infiltration into the furnace from the ambient environment can be a major contributor to nitrogen in the furnace and hence adversely affect NOx emissions. The gap, or joint, between the furnace sidewall and tuckstone is a major source of infiltrating air. Infiltration is facilitated by the velocity head of the cooling air blown against the sidewall since it can produce a static pressure higher than the internal furnace pressure. This problem exists both in oxy-fuel fired furnaces as well as air fired furnaces.

Various approaches have been used to attempt to control the infiltration of air into the furnace. One such approach includes increasing the furnace internal pressure. By creating a higher pressure in the furnace interior than in the surrounding exterior air, furnace gases are forced out of the furnace at all the cracks and gaps in the structure, including the tank sidewall-tuckstone joint. However, at the sidewall-tuckstone joint, the stagnation pressure due to the high velocity cooling air being blown against the exterior of the furnace sidewall creates a static pressure much greater than the internal furnace pressure. Therefore, air continues to leak into the furnace at this joint. Typical furnace pressures are 0.04–0.06" $H_2O$. The stagnation pressure for an air stream, which is a function of the velocity of the stream, at 100 ft/sec, is 2.28" $H_2O$.

Another approach used to attempt to prevent air leakage into the furnace is to use mortar or other suitable compounds to seal the sidewall-tuckstone joint. Typically, the joint is a one-inch gap and the mortar helps to seal it. However, due to the mortar's shrinkage and limited ability to adhere to the two opposing surfaces, minute cracks and gaps occur both within the mortar and at the mortar-joint interface. An appreciable amount of the cooling air stream blown on the tank outer wall therefore can still be forced through these cracks and enter the furnace.

A third approach is to overcoat the furnaces exterior by installing a layer of bricks up against the tank sidewall and under the tuckstone, thereby effectively covering over the existing gap. This works well at first, but the increased sidewall thickness causes higher internal surface temperatures and accelerates the corrosion of the sidewall at the glass line, i.e., the upper surface of the molten glass in the furnace tank. This technique is usually applied only when the existing sidewall has worn thin. While it initially provides a good seal, the brick overcoat will degrade with time.

Another approach to minimizing air infiltration into the tank through the sidewall-tuckstone joint is to redirect the exterior cooling air flow by changing the angle of the air to be more oblique with respect to the tank sidewall. This reduces the stagnation pressure due to the oblique angle and provides marginal benefits but does not eliminate the problem. This configuration will also lessen the cooling function of the cooling air flow.

SUMMARY OF THE INVENTION

The present invention is directed to an arrangement for a furnace that redirects the cooling air flow on the furnace exterior so that it does not infiltrate into the furnace through the sidewall-tuckstone joint or other joint between the furnace tank and its superstructure.

In accordance with the invention a deflector surface, or diverter, is provided near or in the joint to redirect the cooling air away from the joint, that is, to redirect all gases flowing to the joint away from the furnace. This reduces the ambient air pressure at the joint thereby favorably influencing the pressure differential between the furnace exterior and interior at the joint and thus reducing the ability of the cooling air stream to infiltrate into the furnace chamber.

In some cases, the deflector can create a negative pressure at the joint and can cause a flow of furnace gases out of the tank. That is, the pressure within the furnace becomes higher than that exterior to the furnace at the joint or gap so that exterior air cannot infiltrate into the furnace through the joint. This also produces a situation in which the pressure differential favors outflow of gases from the furnace and the infiltration of exterior air into the furnace tank is reduced. By reducing, and preferably eliminating, the air infiltration, both furnace energy consumption and NOx emissions are reduced.

In a preferred embodiment of the invention, the surface of the deflector can be adapted to be an integral part of the furnace tank sidewall construction, preferably as a concave surface shaped like a cove molding. The deflector also can be an add-on to an existing tank sidewall. The deflector results in only a minor change to the tank sidewall exterior geometry and does not affect the functionality of the sidewall cooling air stream or inhibit access to the cold side of the tank sidewall refractory blocks. In either case, the infiltration of exterior air into the furnace tank is reduced or eliminated.

In addition to the invention being used with oxy-fuel fired glass furnaces by eliminating air infiltration to minimize NOx emissions, it also has applicability to air fired furnaces. A benefit of using the subject invention in an air fired furnace is that by eliminating cold air infiltration, the efficiency of the process will be improved by allowing a greater percentage of the combustion air to pass through regenerators and be preheated. A second benefit also concerns NOx reduction in air fired furnaces.

OBJECTS OF THE INVENTION

It is therefore an object of the invention to provide a structure to reduce the infiltration of air from the exterior of a furnace into the furnace interior at the tank sidewall superstructure joint of the furnace.

A further object is to provide a deflector to deflect cooling air away from the tank sidewall superstructure joint of a furnace to increase the static pressure differential between the furnace interior and the exterior at the joint and thereby reduce infiltration of air into the tank at the joint.

An additional object is to provide a deflector integral with a furnace tank sidewall above which a tuckstone, supporting a furnace superstructure is mounted to deflect cooling air away from the tuckstone-sidewall joint or gap and increase the static pressure differential at the gap between the inside of the tank (higher pressure) and the exterior of the tank (lower pressure) to reduce infiltration of air into the tank through the joint or gap.

BRIEF DESCRIPTION OF THE DRAWINGS

Other objects and advantages of the present invention will become more apparent to those skilled in the art upon reference to the following specification and annexed drawings in which.

DETAILED DESCRIPTION OF THE INVENTION

Figure 1:
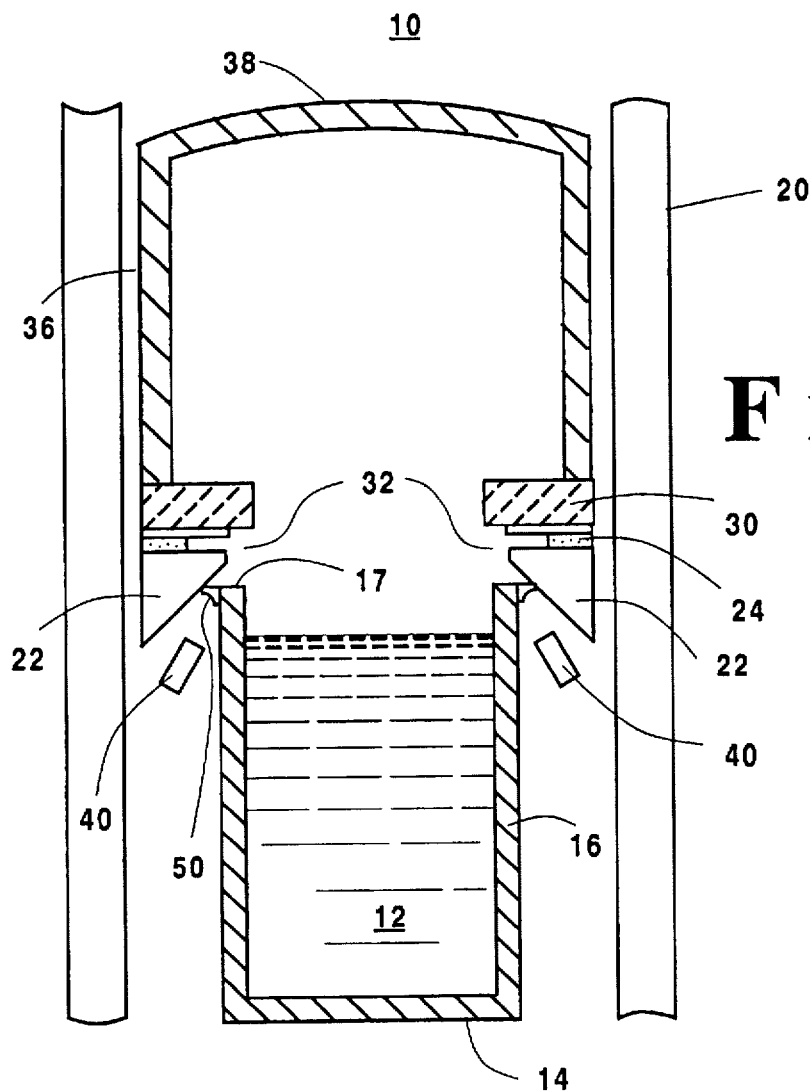
FIG. 1 is an elevational diagrammatic view of a part of a furnace shown in cross-section useful for the practice of the invention.

Referring to FIG. 1, the furnace 10 includes lower tank section 12 with floor 14 and sidewall 16 made of a suitable refractory brick material. The tank can be rectangular or of any other desired shape and is of a size that satisfies the application of its use. Vertical stanchion supports 20, usually of a metal such as steel, and of a suitable number are mounted around the furnace to support all or some of its components. That is, for example, the tank 12 can be mounted between the supports 20 off the ground or placed on the ground.

Near the top end 17 of the tank sidewall 16, brackets 22, usually of a metal such as steel, are connected to the vertical supports 20 extending toward the tank 12. On the tops of the brackets 22 is a plate element 24 of metal, such as steel, which can be a complete shape conforming to the furnace perimeter or can comprise a plurality of sections.

The plate element 24 supports the entire width or a part of the outer width of tuckstone 30. If desired, the tuckstone can be supported directly on the brackets 22 without use of the plate element 24. The tuckstone 30, which is of a suitable refractory material, also can be of sectional construction. As can be seen, there is a gap 32 at the joint between the lower surface of the tuckstone 30 and the upper end 17 of the furnace sidewall 16.

Above the tuckstone 30 and supported directly on the tuckstone upper surface, is the furnace superstructure of sidewalls 36 and crown 38. These are of conventional construction. Any suitable structure can be used for the furnace components and their mounting with respect to each other. The interior of the furnace is supplied with a suitable fuel and oxidant from a source to facilitate the melting and fusing process of making the molten glass from raw materials supplied to the interior of the furnace through an opening (not shown) in the superstructure. The oxidant supplied preferably has a high oxygen content to increase the heat output and the furnace efficiency.

The combustion products within the furnace are expelled to the atmosphere or to a cleaning device, such as a scrubber through a second opening or openings in the superstructure (not shown). Especially when a high oxygen content gas is used (e.g. oxygen-enriched air or pure oxygen), it is desired to prevent nitrogen, such as is contained in the ambient air, from infiltrating into the furnace. Low nitrogen levels reduce the formation of undesirable NOx products.

The furnace 10 is located in an ambient air environment. Cooling gas, for example air, is usually flowed against the outer surface of the upper part of the tank side 16 at a high velocity to cool it. The velocity and volume of the cooling air is selected to meet the application, e.g. size of the tank, outer wall temperature, ambient air temperature, etc. The cooling gas can be directed in an upward direction or at some angle to the tank wall, or positioned at an upper point along the height of the tank 12. Nozzles 40 are illustratively shown near the gap 32, but they can be located at any place relative to the height of the tank sidewall.

As previously explained, it is desired to prevent infiltration of ambient air, which includes the cooling air, into the furnace through the sidewall-tuckstone gap, or joint, 32. To accomplish this, a deflector 50 is located on the outside of the top end 17 of the tank sidewall 16 below the joint 32.

In the embodiments illustrated in FIGS. 1 and 2, the deflector 50 has a concave surface, much like a cove molding, preferably extending entirely around the outer edge of the top end of sidewall 16 at or somewhat below the joint 32. The deflector 50 preferably extends around the full periphery of the sidewall-tuckstone joint 32 and can be made of any material that adheres to the sidewall and is able to withstand the local temperature (e.g., sidewall refractory brick, mortar, ceramic materials, high temperature metals, etc.).

Figure 2:
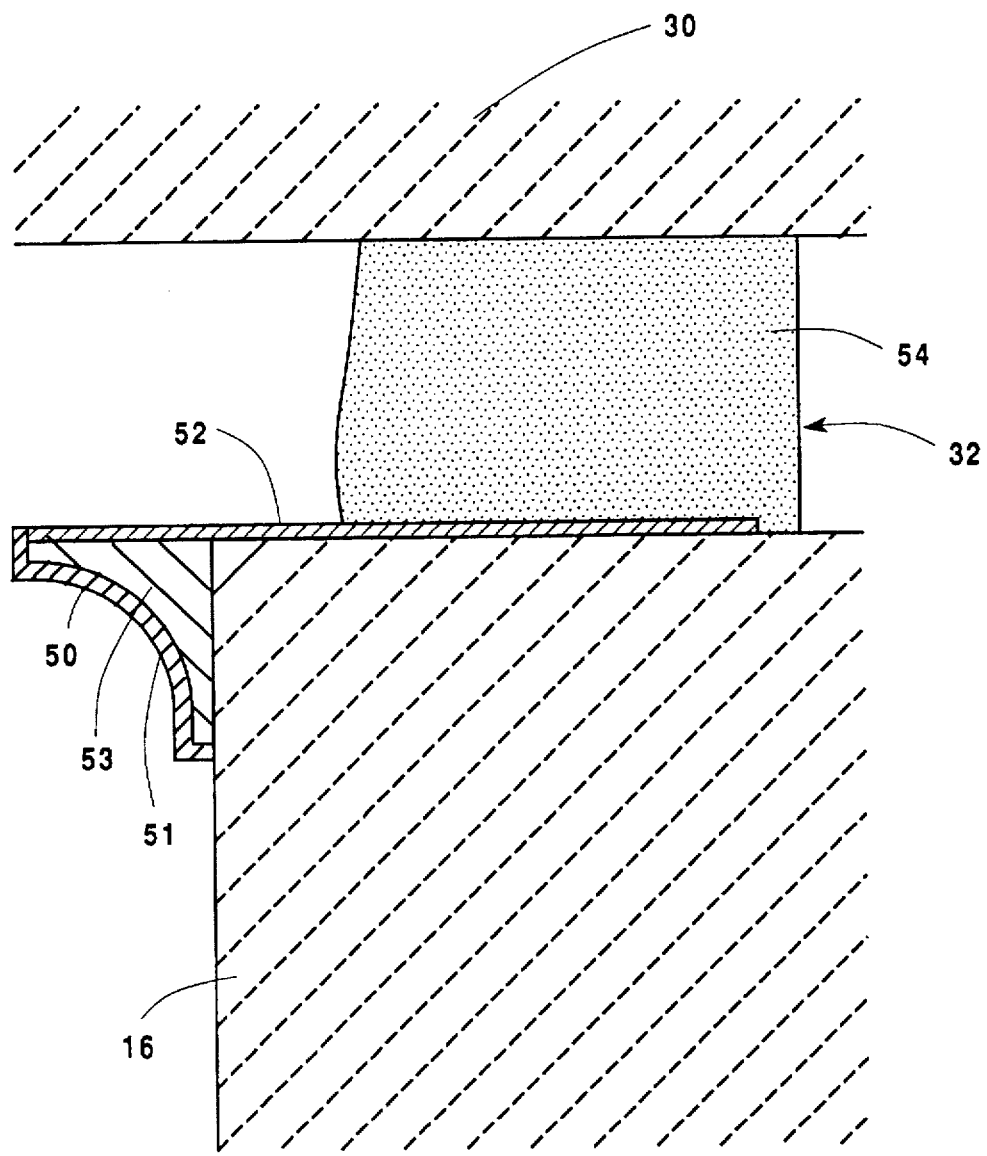
FIG. 2 is an enlarged view of one type of deflector useful with the invention.

As shown more clearly in FIG. 2, the deflector 50 may be a quarter circle concave surface at the top of the sidewall that is tangent to the sidewall surface at the bottom of the deflector and perpendicular to the tank sidewall surface and parallel to the tuckstone surface at the top of the deflector. In the embodiment of FIG. 2, the deflector 50 is formed of sheet steel, e.g., stainless steel, that is formed with the curved surface 51 and a shelf part 52 that rests on the upper end of the tank sidewall 16. The space between the curved surface 51 of the deflector sheet and the tank sidewall is preferably filled with brick mortar 53. A sealant 54 can be placed in the gap 32 between the tank sidewall and the tuckstone. The deflector sheet can be formed in sections, e.g., in 18" lengths.

It is also possible to integrally form the refractory blocks of the tank with the deflector, much like a cove edge tile or brick. Alternatively, the deflector 50 can be a separate piece of heat resistant material that is attached by suitable fasteners to the outer surface of the top end 17 of the tank.

The cooling gas stream from the nozzles 40, or other source, can be perpendicular or at any effective angle to the sidewall 16. The cooling gas source will impinge on the deflector concave surface and be redirected by it from 90 to 180 degrees relative to the direction of impingement. For more optimum operation of the deflector, the incoming cooling gas air stream needs to impact the sidewall below the deflector 50 so that the flow of the air following the contours of the sidewall can be more effectively influenced by the deflector concave surface.

In operation, the cooling air from the nozzles 40, which is at a relatively high velocity, is redirected by the deflector away from the sidewall of the tank and does not cross the gap 32.

An explanation of one aspect of the operation of the invention, based on fluid dynamic theory, is as follows. Whenever a jet of gas, here corresponding to the cooling air, impacts a surface, the gases flow along that surface with the distribution of deflected flow determined by the impact angle relative to the impact point on the impact surface. For example, a jet impacting perpendicular to a surface will distribute uniformly in each direction parallel to the surface. A gas jet impacting at a 45 degree angle degree will send most of the flow (theoretically 85%) in the direction of the jet (180 degrees) when it impacts the wall and a portion of it (theoretically 15%) will go in the other direction (0 degrees).

The air infiltrating into the furnace through the gap 32 appears to be the result of two collisions, that of the external cooling air stream with the sidewall, and that of the resulting vertical stream with the tuckstone. As shown in FIG. 2, the tuckstone usually overhangs the exterior of the tank sidewall. When the vertical cooling air stream impacts the lower surface of the tuckstone, it splits and some goes into the furnace through the gap 32 and the rest flows away from the furnace. Providing a concave deflector surface below the gap between the sidewall and tuckstone prevents the cooling air from directly crossing the gap. That is, when the deflector is used, the cooling air stream hits the deflector and is, in large measure, if not entirely, deflected outwardly of the tank sidewall and away from the gap and the underside of the tuckstone. This reduces the ambient pressure at the gap and reduces or eliminates the air infiltrating into the furnace through the gap. The use of the deflector also creates a pressure differential that reduces the infiltration of ambient air and air from the cooling air stream. Due to the venturi effect of this flow stream, a reduction of the ambient pressure in the area of the deflector 50 and the joint 32 results and creates a pressure differential between the ambient air and the tank internal pressure. This further reduces the possibility of the ambient air infiltrating the furnace 10 through the gap 32.

The creation of the negative or lower pressure region by the deflected jet results from aerodynamics. As a jet leaves a nozzle and passes into a stagnant area, the jet, due to viscous friction, begins to drag the stagnant surrounding gas in the jet direction. This transfer of momentum from the jet to the surroundings results in a slowing of the jet and an acceleration of the surroundings. As gas is removed from the surroundings, a negative pressure is created and gas farther from the jet moves toward the jet to fill the void left by the gas entrained by the jet. When the jet is located near a wall (tuckstone), the magnitude of the negative pressure increases because there is a limited volume of surrounding gas upon which to draw. In the present invention, this entrainment requirement is supplied by furnace gases passing through the gap and thereby prevents any air from entering the gap.

It is preferred that most or all of the air flow across the sidewall be deflected. If the stream of air flowing along the sidewall is 2" thick and the deflector is only ½" tall, then some flow will probably spill over the top of the deflector and hit the tuckstone. It is preferred that the deflector protrusion from the tank sidewall be greater than or equal to the thickness of the air stream flowing along the sidewall. Operating at a protrusion greater than 50% but less than 100% of the air stream thickness is acceptable but is not preferred. The air stream thickness can be estimated knowing the volume flow rate of air per unit length of sidewall and the velocity at which it is supplied.

In some cases, the pressure difference created is such that the pressure in the tank is higher than the pressure near the gap. When this occurs, the gas within the furnace exits through the gap 32 and prevents air infiltration from the ambient. The reduction of infiltrating air, which includes nitrogen, reduces the nitrogen content of the furnace gas and hence the formation and emission of NOx.

In a typical application, the level of the molten material, such as glass, in the furnace tank is usually about two inches below the top end 17 of the sidewall 16. The radius of the deflector 50 quarter circle concave surface is made small enough so that it does not add appreciable thickness to the sidewall, which would affect heat transfer from the wall. A ½ inch radius curve has been found to be satisfactory in an application where the gap 32 size was about 1 inch. The radius of the deflector concave surface possibly can be decreased and still produce the desired effect. Larger radii for the deflector's air receiving surface will work better, but other process conditions, such as the thickness of the tank sidewall 16 would make these less desirable.

Figures 3A, 3B:
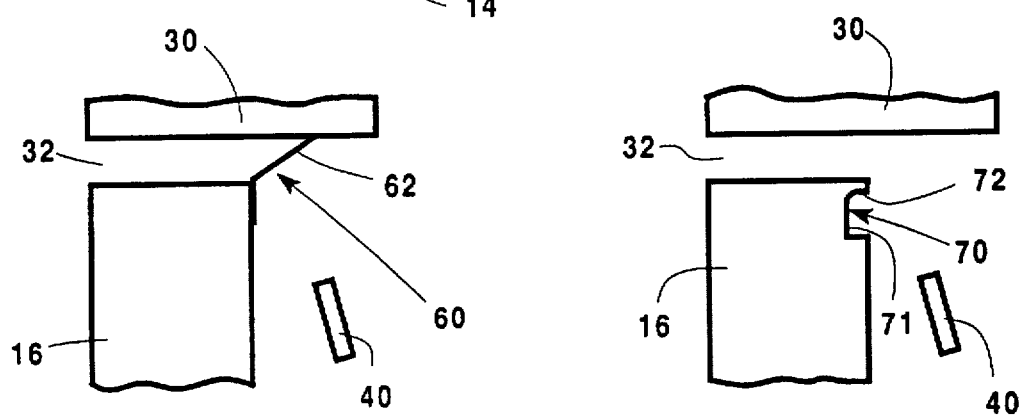
FIGS. 3a–3b are views of other types of deflectors useful with the invention.

The concept of redirecting the air flow can be accomplished in other ways. Shapes other than concave for the deflector 50 are possible. FIG. 3a, which corresponds to the right portion of the furnace of FIG. 1, shows a deflector 60 with a flat outer surface 62 as opposed to a curved one as in the deflector 50. As shown, the deflector 60 is at the edge of the top of the tank sidewall 16 in the gap 32. It can be mounted below the top of the tank sidewall but it would have to be larger. The width of the deflector 60 is equal to or greater than the gap. The surface 62 can be at any suitable angle to the sidewall 16, preferably 45 degrees, although the angle can be less. As in the case of the deflector 50 of FIGS. 1 and 2, the flat surface deflector 60 deflects cooling gas away from the gap 32 to create the desired pressure differential between the ambient and the internal tank pressure. Here also, the deflector 60 can be an integral part of the upper row of bricks of the tank sidewall 16 or it can be a separate piece that is attached. Deflector 60 could be mounted below the top of the tank sidewall if it is made larger, but that would reduce air flow near the top edge of the sidewall.

FIG. 3b shows another embodiment of the invention wherein the deflector is formed by a recess 70 in the sidewall outer surface. The recess 70 has an inner vertical wall 71 parallel to the tank sidewall 16. The top wall 72 of the recess has a concave shape. The cooling air flowing is directed into the recess 70 and is deflected by the initial inner wall 71 and concave upper wall 72 away from the sidewall-tuckstone gap 32. This reduces the ambient pressure at the joint 32, as explained previously. The concavity of the recess upper wall 72 aids in redirecting the cooling air away from the gap.

The invention is also applicable to air-fired furnaces. In conventional practice, when it is desired to reduce NOx emissions in an air fired furnace, the lowest cost solution for small reductions in NOx is to make combustion system adjustments. When moderate reductions in NOx are required, a staging technique is usually employed. This technique works by first producing a fuel-rich area near the burner and adding extra oxidant downstream to complete the combustion. This results in oxygen-deficient areas in the hottest part of the flame, and lower flame temperatures in the oxygen-rich parts of the flame. The net effect of doing this is to reduce NOx emissions by 15–60%.

By applying the subject invention to these types of air fired furnaces, air infiltration, and the oxygen associated with it, can be reduced thereby allowing better control of the reducing and oxidizing sections of the flame and, in turn, better control of the extent of staging and the final NOx emissions. Also, being able to eliminate air infiltration removes a source of variability present in conventional practice so that proper adjustments can be made and maintained more easily.

Considering the system described in U.S. Pat. No. 5,417,731—LeBlanc et al. as an example, the flames in the furnace are run very close to stoichiometric and additional oxygen is added later in the exhaust ports to control unburnt carbon monoxide emissions. With air infiltration present in this furnace, the oxygen levels near the burner would be higher than anticipated, and air leaking in near the exhaust ports would not be properly mixed with the fuel gases and could give readings indicative of high excess oxygen levels. By eliminating this air infiltration through the use of the subject invention, the proper amount of combustion air can be put in the furnace at the desired location to give the best NOx performance, and no extraneous air leaks will negatively impact the combustion or the measuring of combustion conditions used to make judgments on the process. Staging processes would benefit from the subject invention by delivering better control of stoichiometry within the flame by eliminating the uncontrolled, unmeasured and non-uniform air infiltration into the furnace.

Figure 4:
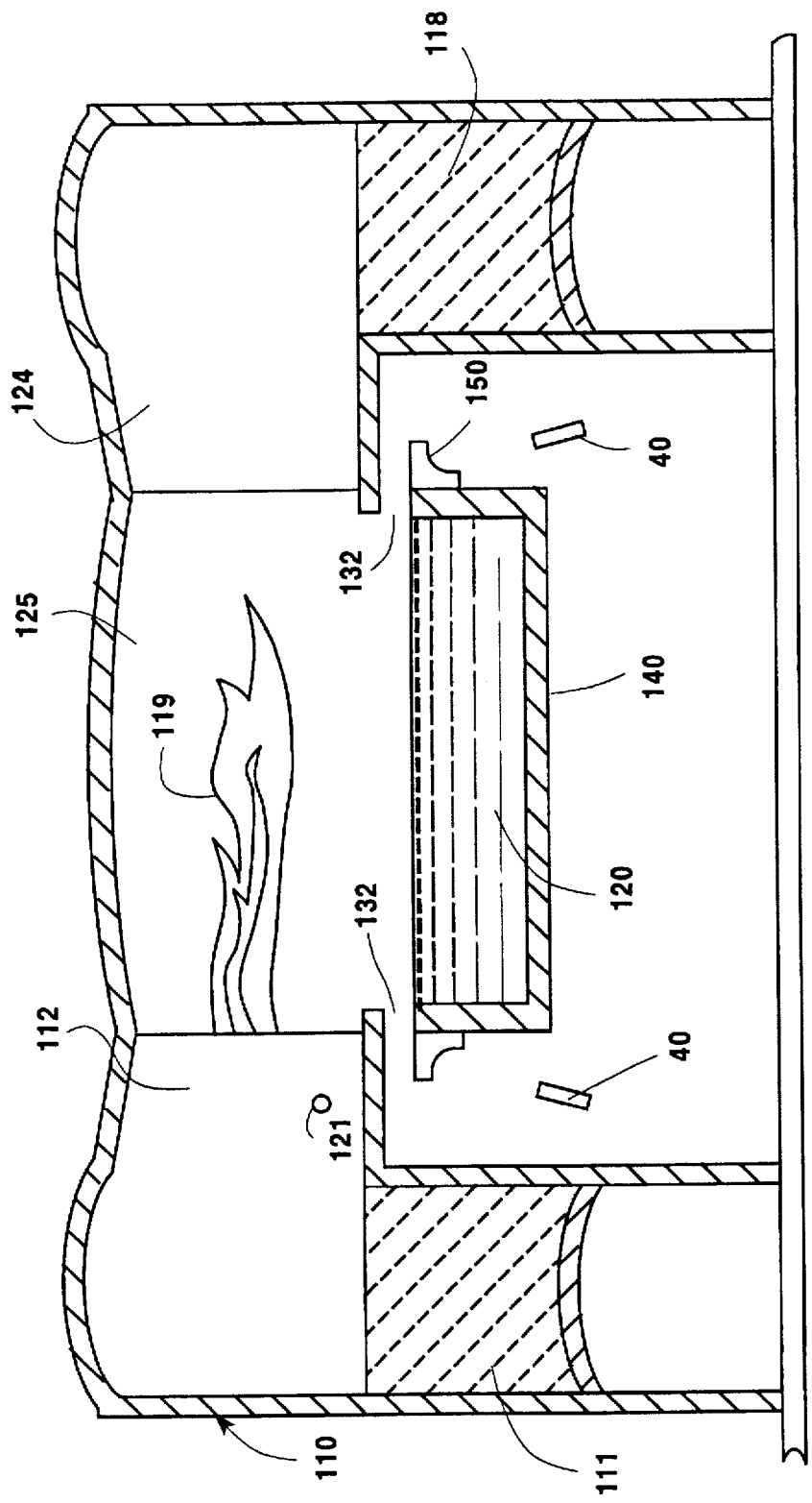
FIG. 4 is an elevational diagrammatic view of an air fired furnace useful for the practice of the invention.

A view of a typical regenerative furnace incorporating features with which the present invention can be used is shown in FIG. 4. Regenerative furnace 110 comprises regenerators 111 and 118, air ports 112 and 124, burner 121 disposed in a sidewall of air port 112 for sideport firing, and combustion chamber 125 in which are disposed load 120, and flame 119 above load 120 in a tank 140. There is a gap 132 between the tank 140 and the furnace structure containing the regenerators 118. The supporting structure for the tank 140 is not shown. Also, there can be a tuckstone between the tank upper edge and the other parts of the furnace structure. The regenerative furnace 110 can be fired with burners positioned above air ports 112 or 124, that is, overport firing, or with burners positioned below air ports 112 or 124, that is, underport firing.

In operation, oxidant, preferably in the form of combustion air, is introduced into the base of regenerator 111 in which the combustion air is preheated. Other oxidants including oxygen-enriched combustion air may be used in the combustion process. From regenerator 111, combustion air flows through primary combustion air port 112 and into combustion chamber 125 where it mixes with fuel, preferably natural gas, from burner 121 to form flame 119. Heat, primarily in the form of radiation, is transmitted from flame 119 to load 120. The amount of material in load 120 which can be processed depends upon the amount of heat transferred from flame 119 to load 120. Thus, the more heat that is transferred from flame 119 to load 120, the greater is the amount of material which can be processed. Load 120 is required for removal of heat from flame 119 to maintain peak flame temperatures generally below the temperature required for significant NOx formation.

Combustion products generated from the combustion of fuel and primary combustion air are exhausted as flue gases from combustion chamber 125 through exhaust port 124 from which they enter regenerator 118. As the hot flue gases pass through regenerator 118 and are exhausted to a stack, heat is transferred from the hot flue gases to regenerator 118. When the temperature in regenerator 118 reaches a certain level, the flows within regenerative furnace 110 are reversed, with primary combustion air being introduced into the base of regenerator 118. As the primary combustion air passes through regenerator 118, heat is transferred from the regenerator to the combustion air which subsequently passes through port 124 and into combustion chamber 125. During this firing cycle, the flame is generated by a burner (not shown) proximate port 124 and the resulting combustion products are exhausted through port 112 and regenerator 111.

As in the embodiment of furnace 10 of FIG. 1, the furnace 110 of FIG. 4 has nozzles 40 around its outer periphery to provide cooling air, and a deflector 150 around the outer periphery of the tank 140. The deflector 150 can be of the types shown in FIGS. 2, 3a and 3b, and the various modifications thereof as previously described. As previously explained, the deflector 150 has the dual effect of directing the cooling air away from the gap to prevent its infiltration into the furnace 140 and also to create the pressure differential at the gap 132.

Specific features of the invention are shown in one or more of the drawings for convenience only, as each feature may be combined with other features in accordance with the invention. Alternative embodiments will be recognized by those skilled in the art and are intended to be included within the scope of the claims.

I claim:

1. A furnace comprising: a tank having a sidewall; a structure above the upper end of said sidewall with a gap therebetween; and a deflector located proximate the gap to divert a flow of air impinging on the sidewall exterior away from said gap to create a differential between the pressure interior of the tank and exterior thereto and to reduce the infiltration of air through said gap into the interior of said tank; said furnace further comprising a source for directing cooling air onto the exterior of said sidewall and said deflector; wherein the surface of the deflector that receives the cooling air is shaped to direct at least a portion thereof outwardly of the tank sidewall.

2. A furnace as in claim 1, wherein said deflector comprises a concave surface that receives the flow of air.

3. A furnace as in claim 1 wherein said deflector comprises a flat surface angled outwardly from the exterior of said sidewall.

4. A furnace as in claim 1 wherein said deflector extends between the upper end of the said sidewall and the bottom surface of said structure.

5. A furnace as in claim 1 wherein said deflector comprises a channel recess around said sidewall adjacent the upper end thereof.

6. A furnace as in claim 1 wherein said structure comprises a tuckstone above the upper end of said tank sidewall and a superstructure above said tuckstone.

7. A method of reducing air infiltration into a gap between a furnace tank and a structure above the tank comprising the steps of:

directing cooling air onto the outer wall of said tank to have at least a portion flow toward the gap; and providing a deflector located proximate the gap to divert air impinging on the tank exterior away from the gap and to create a differential between the pressure interior of the tank and exterior thereto.

8. A method as in claim 7 wherein the pressure differential created makes the pressure of the exterior of the tank less than that of the interior of the tank at the gap.

* * * * *